(12) United States Patent
Zhang et al.

(10) Patent No.: US 10,544,728 B2
(45) Date of Patent: *Jan. 28, 2020

(54) METHODS AND SYSTEMS FOR AN ELECTRIC TURBOCHARGER

(71) Applicant: Ford Global Technologies, LLC, Dearborn, MI (US)

(72) Inventors: Xiaogang Zhang, Novi, MI (US); Chee Haw Chan, Woodhaven, MI (US); Lynn Aimee Chesney, Flat Rock, MI (US); Patrick Matthews, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/892,097

(22) Filed: Feb. 8, 2018

(65) Prior Publication Data

US 2019/0242296 A1 Aug. 8, 2019

(51) Int. Cl.
| | |
|---|---|
| *F02B 37/10* | (2006.01) |
| *F02B 39/10* | (2006.01) |
| *F02D 41/00* | (2006.01) |
| *F02B 37/12* | (2006.01) |
| *F02D 41/06* | (2006.01) |
| *F02D 41/08* | (2006.01) |

(52) U.S. Cl.
CPC .............. *F02B 37/12* (2013.01); *F02B 37/10* (2013.01); *F02B 39/10* (2013.01); *F02D 41/0007* (2013.01); *F02D 41/064* (2013.01); *F02D 41/08* (2013.01); *F02D 2200/0406* (2013.01)

(58) Field of Classification Search
CPC ...... F02B 37/18; F02B 37/186; F01N 3/2006; F01N 13/0087; F01N 2410/06; B60T 17/02; B60T 13/52
USPC ........................................................ 60/605.2
See application file for complete search history.

(56) References Cited

U.S. PATENT DOCUMENTS

| | | | | |
|---|---|---|---|---|
| 4,745,755 | A * | 5/1988 | Kawamura | ........... F02B 37/005 290/52 |
| 5,079,921 | A | 1/1992 | McCandless et al. | |
| 6,735,945 | B1 | 5/2004 | Hall et al. | |
| 8,925,302 | B2 | 1/2015 | Ruona et al. | |
| 9,404,415 | B2 * | 8/2016 | Ruona | .................. F02B 37/183 |
| 9,624,855 | B2 | 4/2017 | Leone et al. | |
| 2010/0300405 | A1 | 12/2010 | Uhrich et al. | |
| 2013/0283898 | A1 * | 10/2013 | Rollinger | ................ G01M 3/26 73/114.77 |
| 2013/0323433 | A1 * | 12/2013 | Lee | .......................... B05D 3/06 427/555 |
| 2014/0060006 | A1 * | 3/2014 | Ruona | ................... F02B 37/183 60/273 |
| 2014/0196454 | A1 | 7/2014 | Ulrey et al. | |

(Continued)

*Primary Examiner* — Patrick D Maines
*Assistant Examiner* — Dapinder Singh
(74) *Attorney, Agent, or Firm* — Geoffrey Brumbaugh; McCoy Russell LLP

(57) ABSTRACT

Methods and systems are provided for an electric turbocharger. In one example, a method rotating a turbine of the electric turbocharger in a reverse direction, the turbine being mechanically coupled to a compressor via a shaft. The rotation of the turbine may be adjusted based on a cold-start and/or engine operating conditions outside of the cold-start.

18 Claims, 4 Drawing Sheets

(56) References Cited

U.S. PATENT DOCUMENTS

2015/0113980 A1* 4/2015 Ruona ............... F02B 37/183
                                                                        60/600
2017/0122229 A1   5/2017 Ossareh et al.

\* cited by examiner

METHODS AND SYSTEMS FOR AN ELECTRIC TURBOCHARGER

FIELD

The present description relates generally to using an electric turbocharger to adjust intake and exhaust passage pressures.

BACKGROUND/SUMMARY

Reduction of tailpipe emissions may be a shared goal among manufacturers in the automotive industry. As the standards for emissions continue to increase, technologies may continually improve to meet the standards. Tailpipe emissions based on current standards may need to be reduced to meet future regulations. Previous approaches to reducing cold-start emissions include developing catalysts that can warm up quickly and light-off at lower temperatures and optimizing engine cold start conditions to deliver heat to the catalyst as quickly as possible. However, even with fast catalyst light-off, there is still a duration of time during a cold start when the catalyst is not warm enough to convert emissions species.

Some approaches utilize electric heaters to directly heat the catalyst. However, these approaches may demand additional energy storage devices arranged on-board a vehicle. Additionally or alternatively, such systems demand additional electrical connections between the electric heater and the energy storage device which may be difficult to route due to complex packaging of the engine. The electric heater and its wiring may be prone to degradation due to the high temperature environment about which they are arranged.

In other approaches, a backpressure valve may be introduced to the exhaust passage. The backpressure valve may increase backpressure during the cold-start. For example, U.S. Pat. No. 9,624,855 by Leone et al. teaches a backpressure valve arranged downstream of a catalyst. The valve may be activated during a cold-start to increase exhaust backpressure, which may allow the catalyst to reach a light-off temperature before emissions are released to an atmosphere.

However, the inventors herein have recognized potential issues with such systems. As one example, the valve increases packaging restraints and may be difficult to install due to the compact packaging of modern engine systems. Furthermore, the valve may provide no other function other than increasing exhaust backpressure. Lastly, the backpressure vale also demands its own wiring and connections to a controller and energy storage systems of the vehicle.

In one example, the issues described above may be addressed by a method comprising determining an engine cold-start and rotating a turbine of an electric turbocharger in a reverse direction to increase exhaust backpressure, the turbine being mechanically coupled to a compressor via a shaft. In this way, the turbine and the compressor are spun in reverse directions such that exhaust backpressure increases and intake manifold vacuum increases.

As one example, increasing intake manifold vacuum may allow vacuum of one or more vacuum consumption devices to increase. By synergistically utilizing the reverse spinning of the turbine to also reverse spin the compressor, vacuum may be replenished as the catalyst is warmed-up via the increased exhaust backpressure. Additionally, the turbine and compressor may be utilized to adjust intake pressures during engine operating conditions outside of a cold-start. For example, if manifold absolute pressure (MAP) increases to a MAP greater than an upper limit of a desired range, then the turbine, and therefore the compressor, may be spun in reverse to decrease MAP. This may increase exhaust backpressure, however, a rotational speed of the turbine is adjusted such that the exhaust backpressure may be tolerated during engine operating conditions outside of the cold-start such that combustion stability is not adversely effected.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for an electric turbocharger. The electric turbocharger may be included in a hybrid vehicle comprising an engine, such as the hybrid vehicle of FIG. 1.

Figure 3:
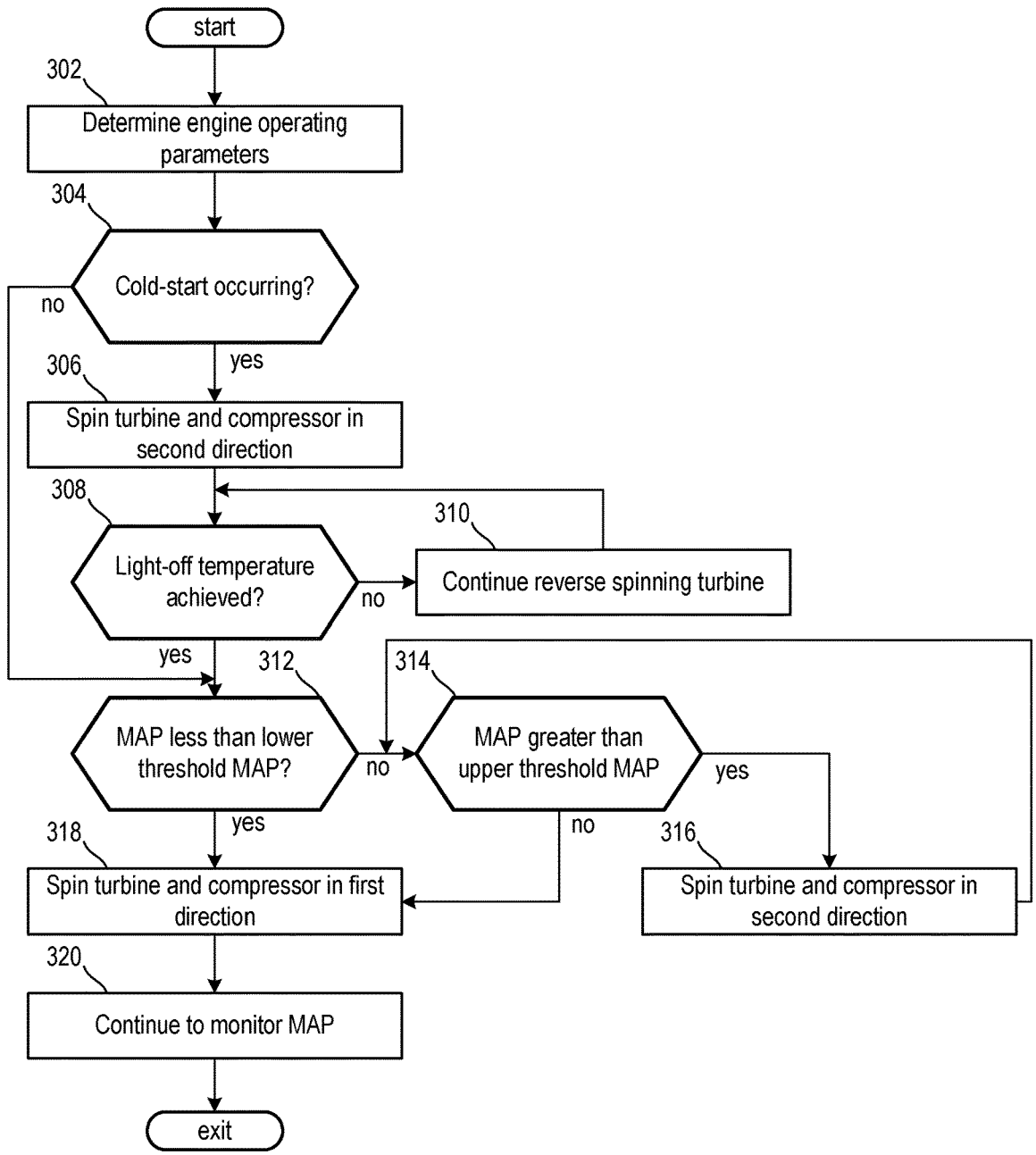
FIG. 3 shows a method for operating the electric turbocharger.
Figure 4:
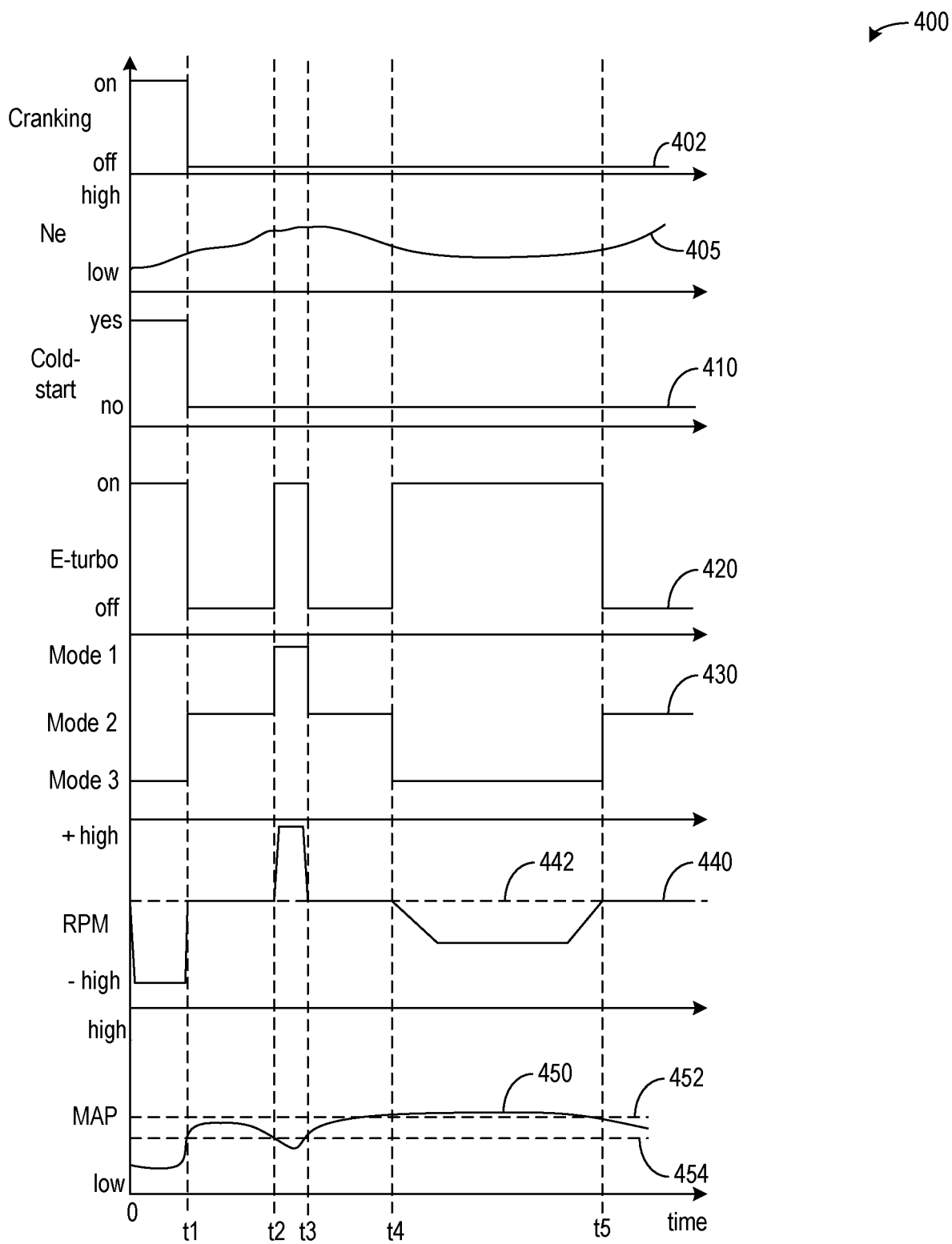
FIG. 4 shows a graph illustrating a graphical representation of the method of FIG. 3.

In some examples, the electric turbocharger comprises an electrically powered turbine mechanically coupled to a compressor. The turbine and the compressor are shown being spun in a forward direction in FIG. 2A. When the turbine and compressor are spun in a forward direction, boost air may flow to the engine. Thus, exhaust backpressure may not increase and manifold vacuum may not be produced. However, when the turbine and the compressor are spun in a reverse direction, opposite the forward direction, exhaust backpressure may increase and manifold vacuum may be generated, as shown in FIG. 2B. Thus, boost air may not flow to the engine when the turbine and compressor are spun in the reverse direction. The turbine and compressor may be spun in the reverse direction during a cold-start and other engine conditions, as shown in the method of FIG. 3. FIG. 4 illustrates a graphical representation of the method 300, including adjusting a rotation speed of the turbine to adjust manifold pressure and/or exhaust backpressure.

Figure 1:
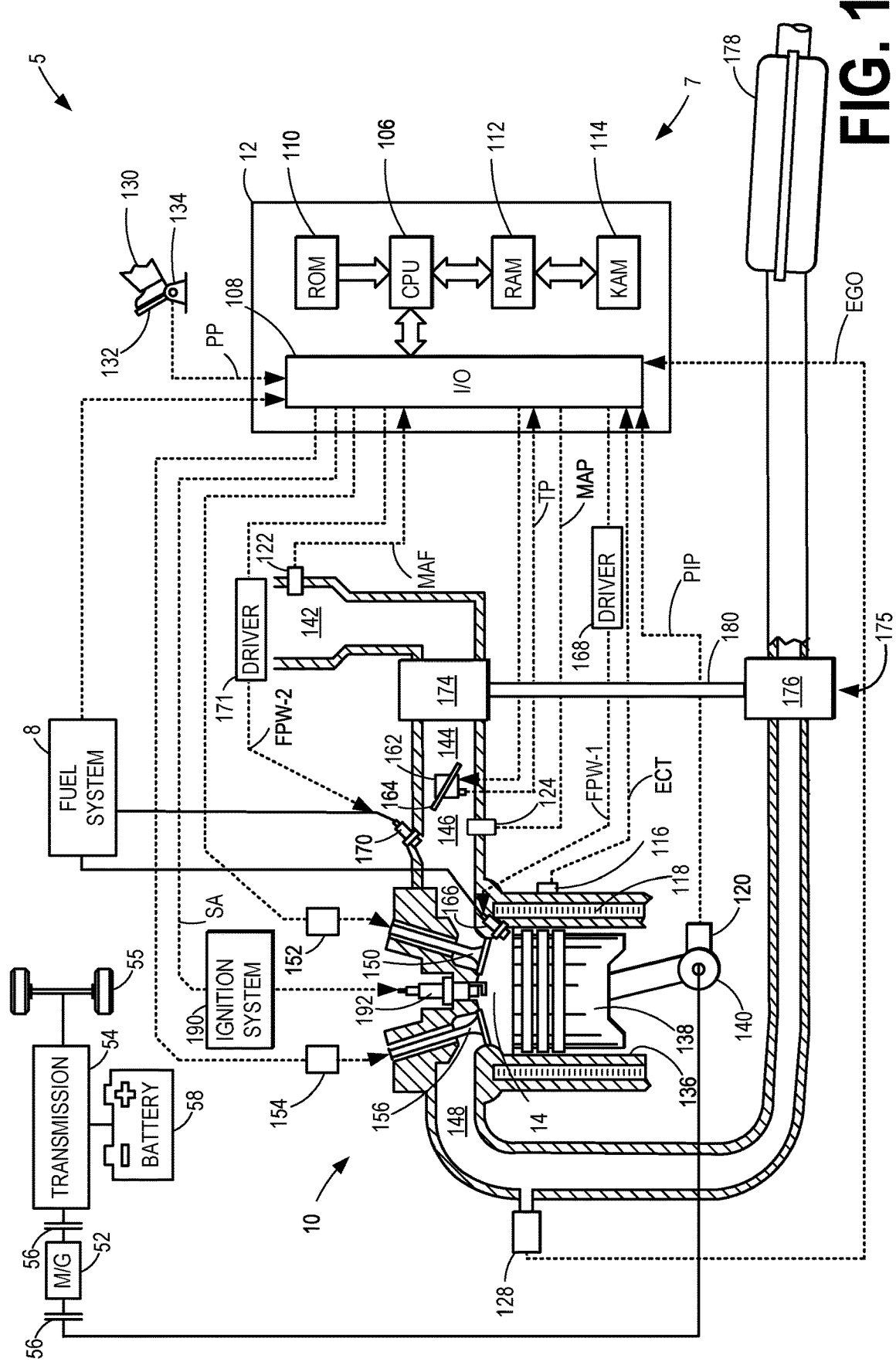
FIG. 1 shows an engine of a hybrid vehicle.
Figure 2A:
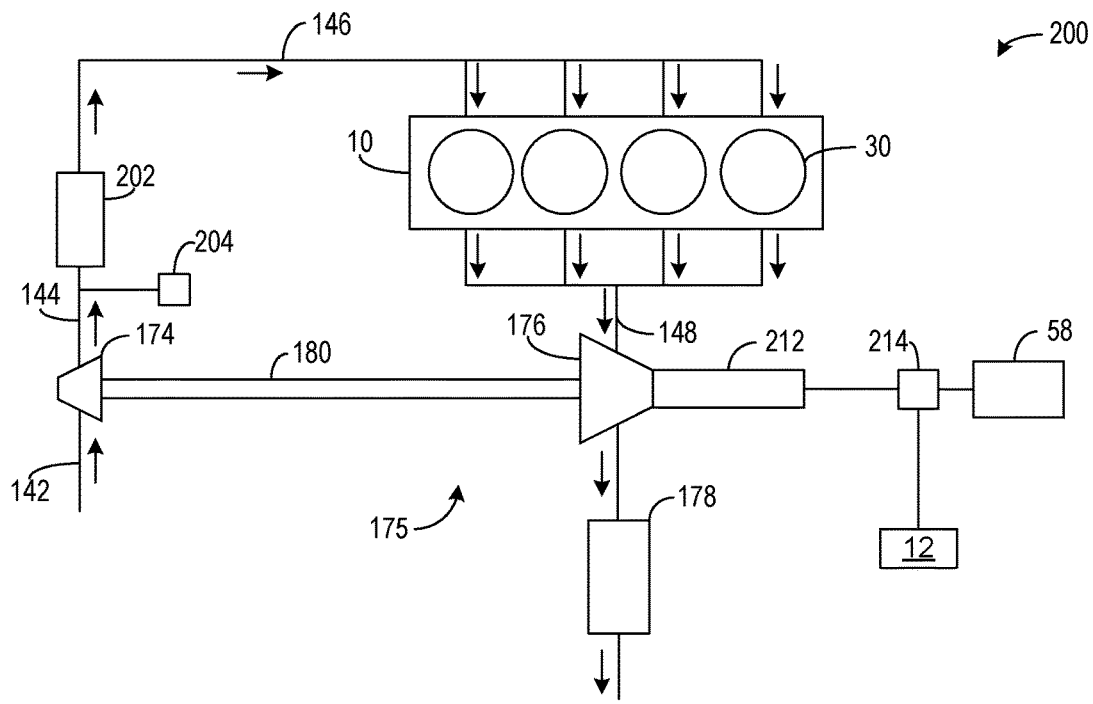
FIGS. 2A and 2B show forward spinning and reverse spinning operations of an electric turbocharger, respectively.
Figure 2B:
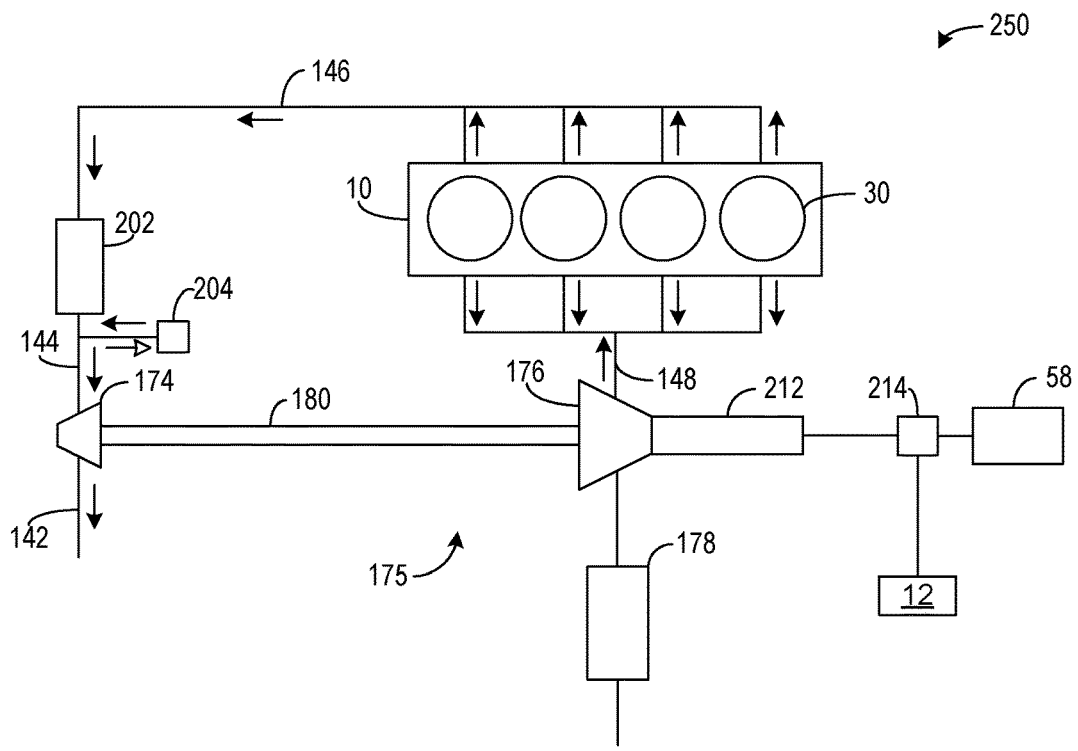

FIGS. 1, 2A, and 2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 12 receives signals from the various sensors of FIG. 1 and employs the various actuators of FIG. 1 to adjust engine operation based on the received signals and instructions stored on a memory of the controller. For example, adjusting a rotational speed and direction of the turbine 176 may include adjusting a signal provided to an actuator of the turbine 176 sent by the controller 12. In some examples, the rotational speed and direction of the turbine 176 are adjusted in response to one or more of a cold-start and pressures of the intake and exhaust passages. Thus, the turbine 176, and therefore the compressor 174, may be rotated in forward and reverse directions, wherein the forward direction results in boost flowing to the engine 10 and where the reverse direction results in increased exhaust backpressure and manifold pressure decreasing.

Turning now to FIGS. 2A and 2B, they show embodiments 200 and 250, respectively, of the turbocharger 175 of FIG. 1. As such, components previously present may be similarly numbered in subsequent figures. The turbocharger 175 is illustrated as an electric turbocharger wherein the turbine 176 is directly coupled to an electric motor 212 configured to power the turbine 176 when receiving power from battery 58. It will be appreciated that the electric motor 212 may be used similarly to electric motor 52 of FIG. 1 without departing from the scope of the present disclosure. Power supply from battery 58 to the electric motor 212 may be adjusted via a power actuator 214. The controller 12 may signal to the power actuator when and how much power to direct from the battery 58 to the electric motor 212. By sending power to the electric motor 212, the turbine 176 may spin and/or rotate in a particular direction.

Rotation of the turbine 176 may result in similar rotation of the compressor 174 due to the shaft 180 mechanically coupled therebetween. Thus, if the turbine 176 rotates in a first direction, the compressor 174 may spin in the first direction at a similar speed. Additionally, if the turbine 176 spins in a second direction, the compressor 174 may spin in the second direction. Herein, the first direction may refer to a forward direction and the second direction may refer to a reverse direction. The first direction may include the compressor 174 flowing boost air to the engine 10, thereby increasing a manifold absolute pressure (MAP). The second direction, opposite to the first direction, may include the compressor 174 and turbine 176 spinning such that intake air passage 146 and boost chamber 144 pressures decrease (e.g., MAP decreases) and exhaust backpressure in the exhaust passage 148 increases. Thus, the first direction may include the compressor 174 and the turbine 176 spinning clockwise about their axes of rotation while the second direction may include the compressor 178 and the turbine 176 spinning counterclockwise about their axes of rotation. As illustrated and described above, rotation of the compressor 174 and turbine 176 may be initiated by the electric motor 212 directing the turbine 176 as to which direction to rotate and with what speed to rotate.

Turning now to FIG. 2A, which shows the embodiment 200 of the electric turbocharger 175 spinning in the first direction (e.g., forward direction). Arrows indicate a general direction of gas flow. The turbine 176 may allow exhaust gas to flow to the catalyst 178 without actively attempting to increase exhaust backpressure. Rotation of the turbine 176 is translated to the compressor 174, wherein spinning of the compressor 174 promotes boost air to flow through the intake air passages 142, 144, and 146. Boost air may flow to a charge-air-cooler (CAC) 202, where the CAC 202 may cool the boost air, and thereby increase its density. This may increase an engine power output and MAP.

Operation of the turbine 176 and compressor 174 in the first direction may not lead to vacuum replenishment of a vacuum reservoir 204. The vacuum reservoir 204 is shown fluidly coupled to boost chamber 144, however, the vacuum reservoir 204 may be fluidly coupled to the intake air passage 146 and/or intake manifold 146 without departing from the scope of the present disclosure. In some examples, the vacuum reservoir 204 may store vacuum and provide the stored vacuum to one or more vacuum consumption devices including but not limited to a brake booster or a vacuum actuated valve. Thus, when the electric turbocharger 175 is directed to spin in the forward direction, MAP may be too high to provide vacuum to the vacuum reservoir.

In some examples, the electric turbocharger may be directed to spin in the first direction in response to one or more of MAP being less than a lower threshold MAP, driver demand, and engine operating conditions being outside of a cold-start. For example, if a driver performs a tip-in, boost may be demand and the electric turbocharger 175 may be directed to spin in the first direction to meet the boost demand.

Turning now to FIG. 2B, it shows the embodiment 250 of the electric turbocharger 175 spinning in the second direction (e.g., reverse direction). Black headed arrows indicate a direction of gas flow and a white headed arrow indicates a direction of vacuum flow. As shown, the direction of gas flow in the embodiment of FIG. 2B is opposite to the direction of gas flow in the embodiment of FIG. 2A. The gas flow in the embodiment of FIG. 2B intends to increase an exhaust gas backpressure and decrease intake pressure (e.g., decrease MAP). In some examples, spinning the electric turbocharger in the second direction may occur during at least a cold-start such that the exhaust backpressure may expedite warm-up of the catalyst 178. Additionally or alternatively, spinning the electric turbocharger in the second direction may occur when a manifold air pressure (MAP) increases to a value greater than an upper threshold MAP. At any rate, spinning the electric turbocharger 175 in the second direction may result in compressed exhaust gas to flow toward the engine 10 from the turbine 176 and boosted air from the compressor 174 to flow to an ambient atmosphere.

Operation of the turbine 176 in the second direction results in exhaust gases flowing back toward the engine 10. As shown, exhaust gas backpressure may increase between the engine 10 and the turbine 176. The exhaust gas between the engine 10 and turbine 176 may continue to warm-up as the engine 10 heats up. Additionally, the exhaust gas may further heat up due to exothermal oxidations occurring between unburned HCs and CO. In some examples, a small amount of exhaust gas may reach the catalyst 178 while the turbine 176 is spinning in the second direction, the small amount of exhaust gas heating the catalyst 178 toward its light-off temperature.

Furthermore, spinning the turbine 176 in the second direction results in translational movement of the compressor 174 in the second direction via the shaft 180. By spinning the compressor in the second direction, air flow through the intake air passages 142, 144, and 146 may be reversed. As shown, boost air may flow through the intake air inlet 142 and to an ambient atmosphere. Furthermore, a pressure of the intake air passages 144 and 146 may decrease (e.g., MAP decreases) such that a vacuum is generated. The vacuum reservoir 204 may provide suck flow to the boost chamber 144 (shown by black head arrow) as it receives vacuum from the boost chamber 144 (shown by white head arrow). Thus, vacuum replenishment of the vacuum reservoir 204 may occur. It will be appreciated that a check valve may be arranged in the passage connecting the vacuum reservoir 204 to the boost chamber 144. The check valve may be configured such that air may only flow from the vacuum reservoir to the boost chamber. Thus, the check valve may open only in response to a vacuum in the boost chamber 144 or other portion of the intake being stronger than a vacuum stored in the vacuum reservoir 204. The vacuum in the intake may be stronger than the vacuum in the vacuum reservoir if its pressure is lower. In this way, suck flow from the vacuum reservoir 204 may be compressed by the compressor 174 and directed to an ambient atmosphere when it spins in the second direction.

Rotational speeds of the turbine 176 and the compressor 174 may be adjusted in response to one or more of MAP, exhaust gas backpressure, combustion stability, engine temperature, and the like. These adjustments will be described in the method of FIG. 3 below.

Turning now to FIG. 3, it shows a method 300 for operating an electric turbocharger (e.g., electric turbocharger 175 of FIGS. 2A and 2B) based on MAP and/or catalyst or engine temperatures. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, where the method 300 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

The method 300 may proceed to 304, which may include determining if a cold-start is occurring. A cold-start may be occurring if an engine temperature is less than an ambient temperature, if the engine temperature is less than a desired operating temperature, and/or if a catalyst (e.g., catalyst 178 of FIGS. 1, 2A, and 2B) is not lit-off. A light-off temperature of a catalyst may be based on a temperature of the catalyst where it is catalytically active.

If one or more of the engine temperature is less than the ambient temperature, the engine temperature is less than the desired engine temperature, and the catalyst is not lit off, then the cold-start may be occurring and the method 300 may proceed to 306, which may include spinning the turbine and compressor in the second direction. As described above, the second direction is a reverse direction where exhaust gas backpressure may increase and MAP may decrease. The turbine and the compressor may spin at similar speeds in the second direction. It will be appreciated that rotational speeds of each may be adjusted based on an amount of power supplied by the battery to the electric motor coupled to the turbine.

In one example, the method adjusts the amount of power supplied to the electric motor in response to one or more of exhaust backpressure, combustion stability, MAP, and vacuum production. For example, the controller may determine a control signal to send to the power actuator (e.g., power actuator 214 of FIGS. 2A and 2B), such as an electrical signal being determined based on the combustion stability. The combustion stability may be measured or estimated based on feedback from sensors arranged in the intake passage or exhaust gas passage. For example, if feedback from a pressure sensor arranged between the engine and the turbine senses exhaust backpressure exceeding a threshold pressure, then it may be predicted that combustion stability may decrease below a threshold stability.

As another example, the controller may make a logical determination based on logic rules that are a function of combustion stability. The controller may then generate a control signal that is sent to the power actuator, which may decrease a rotational speed of the turbine, which may decrease exhaust backpressure and increase combustion stability.

Additionally or alternatively, a rotational speed of the turbine, and thereby the compressor, may be adjusted based on a vacuum demand of the vacuum reservoir (e.g., vacuum reservoir 204 of FIGS. 2A and 2B). As an example, if the vacuum demand is relatively high and an amount of vacuum stored in the vacuum reservoir is less than a threshold store (e.g., less than 10%), then rotational speeds of the turbine and compressor may be increased to allow the compressor to increase vacuum generation in the intake. This may provide a deeper, stronger vacuum to the vacuum reservoir.

At any rate, it will be appreciated that the electric turbocharger comprising the turbine and compressor may be spun in first or second directions during engine operating parameters outside of the engine cold-start. Such engine operating parameters may include MAP, vacuum demand, and boost demand. Thus, the turbine and compressor may be spun in the first or second directions opportunistically to satisfy the above operating parameters while taking into account driver demand and combustion stability.

The method 300 may proceed to 308, which may include determining if a light-off temperature of the catalyst is reached. A temperature sensor arranged upstream or downstream of the catalyst may provide feedback regarding a current temperature of the catalyst. Additionally or alternatively, the temperature sensor may be arranged in the catalyst. In some embodiments, the temperature of the catalyst may be predicted via data stored in a multi-input look-up table, wherein the inputs correspond to time elapsed, rotational speed of the turbine, exhaust backpressure, and ambient temperature. In such an example, a temperature sensor may be omitted.

If the catalyst temperature is not at or above its light-off temperature, then the method 300 may proceed to 310 to continue spinning the turbine in the second direction. Thus, intake vacuum continues to be produced and exhaust backpressure continues to increase. The method may continue to monitor catalyst temperatures and other engine operating parameters as the turbine and compressor spin in the second direction, as depicted in FIG. 2B.

If the light-off temperature is achieved and/or if the cold-start is not occurring, as described above at 304, then the method 300 may proceed to 312, which may include determining if a MAP is less than a lower threshold MAP. The lower threshold MAP may be a dynamic value based on a desired air/fuel ratio. As an example, if the desired air/fuel ratio increases (e.g., air demand increases), then the lower threshold MAP may proportionally increase. Additionally or alternatively, the lower threshold MAP may be based on an engine load. As an example, if the engine load increases, then air demand may increase and the lower threshold MAP may proportionally increase. If the MAP is less than the lower threshold MAP, then the engine may not be receiving a desired amount of intake air.

If the MAP is greater than or equal to the lower threshold MAP, then the method 300 proceeds to 314, which includes determining if the MAP is greater than an upper threshold MAP. Similar to the lower threshold MAP, the upper threshold MAP may be a dynamic value based on one or more of a desired air/fuel ratio and engine load. For example, if the desired air/fuel ratio increases, then the upper threshold MAP may proportionally increase. The upper threshold MAP may be greater than the lower threshold MAP such that a range of possible MAPs exist between the upper and lower threshold MAPs. In this way, the lower threshold MAP and upper threshold MAP may define lower and upper boundaries, respectively, of a desired MAP range.

If the MAP is greater than the upper threshold MAP, then the method 300 may proceed to 316, which may include spinning the turbine and compressor in the second direction. The turbine and the compressor may continue to spin in the second direction until the MAP decreases to a MAP less than the upper threshold MAP. The MAP may be greater than the upper threshold MAP in response to an engine speed decreasing to an idle engine speed. This may result in a rapid decrease in intake air demand, which may result in the upper threshold MAP decreasing. As such, the compressor and turbine may be activated during the idle engine condition or similar engine condition where the MAP is greater than the upper threshold MAP to spin in the second direction (e.g., reverse direction). In some examples, if the idle engine condition or other similar engine condition (e.g., low load) extends for a sufficient duration, then the compressor may decrease MAP to a low enough pressure such that a vacuum is formed. The vacuum may be supplied to one or more vacuum reservoirs (e.g., reservoir 204 of FIGS. 2A and 2B).

If the MAP is less than or equal to the upper threshold MAP at 314 or if the MAP is greater than or equal to the lower threshold MAP at 312, then the method 300 may proceed to 318, which may include spinning the turbine and compressor in the first direction. The first direction is a forward direction opposite to the second direction, wherein spinning the turbine and the compressor in the forward direction results in a reduction of exhaust backpressure, reduction of vacuum generation in the intake, and increase of boost provided to the engine.

The method 300 may proceed to 320 which may include continuing to monitor MAP. The controller may adjust operating parameters of the electric turbocharger based on the MAP. For example, if the MAP begins to decrease toward the lower threshold MAP, then the controller may increase a rotational speed of the turbine and compressor to prevent the MAP from falling below the lower threshold MAP.

Turning now to FIG. 4, it shows a graph 400 illustrating the method 300 of FIG. 3 being executed in combination with the engine and electric turbocharger of FIGS. 1, 2A, and 2B. Cranking is depicted by plot 402, engine speed is depicted by plot 405, cold-start is depicted via plot 410, e-turbo is depicted via plot 420, a mode of the e-turbo is depicted via plot 430, rotations per minute is depicted via plot 440, where zero rotations per minute is depicted by dashed line 442, and MAP is depicted via plot 450, where dashed lines 452 and 454 illustrate upper and lower threshold MAPs, respectively. Mode 1 may refer to the turbine and the compressor being spun in the first, forward direction. Mode 2 may refer to the turbine and the compressor not being spun. Mode 3 may refer to the turbine and the compressor being spun in the second, reverse direction. The horizontal axis of the graph 400 illustrates time, where time increases from a left to a right side of the figure.

Prior to t1, a cold-start is occurring, as shown by plot 410. During the cold-start cranking may occur (as shown by plot 402), wherein a starter motor may assist the engine increase its speed. As a result, the engine speed, shown by plot 405, may also increase. As described above, the cold-start may be occurring in response to one or more of an engine temperature being less than a desired temperature, the engine temperature being less than an ambient temperature, and a catalyst temperature being less than a light-off temperature. In response to the cold-start, the electronic turbocharger is activated, as shown by plot 420 aligning with "ON". The electronic turbocharger is activated in mode 3, as shown by plot 430, wherein mode 3 includes rotating the turbine and the compressor in the second direction. A negative RPM is associated with rotating the turbine and compressor in the second direction, as shown by plot 440. As described above, the second direction may include increase an exhaust backpressure and decreasing an intake pressure. The MAP is less than the lower threshold MAP, as shown by plot 450 being below than the dashed line 454, thereby illustrating vacuum is being produced in the intake.

Approaching t1, the cold-start is about to end. As such, the RPM of the compressor and turbine begin to adjust toward zero. This allows the MAP to increase toward the lower threshold MAP. The engine speed continues to increase.

At t1, the cold-start is complete and the catalyst may be lit-off or the engine temperature may be greater than the ambient temperature and operating within a desired engine temperature range. The MAP may be substantially equal to a MAP between the lower threshold MAP and the upper threshold MAP while the RPM of the turbine and compressor are substantially equal to zero. As a result, the electronic turbocharger may be adjusted to mode 2 where it is deactivated (e.g., "OFF").

Between t1 and t2, the MAP remains between the lower and upper threshold MAPs. As such, the electronic turbocharger may remain deactivated in mode 2. As such, the RPM is substantially equal to zero. The engine speed may continue to increase.

At t2, the MAP decreases to a MAP less than the lower threshold MAP. The electric turbocharger may be activated to an ON position and the operated in mode 1, which includes spinning the turbine and the compressor in the first, forward direction. By doing this, boost air may flow to the engine, thereby increasing MAP.

Between t2 and t3, the MAP begins to increase toward the lower threshold MAP due to the electric turbocharger operating in mode 1, where the turbine and compressor spin in the first direction. The boost air provided by the compressor continues to increase the MAP to a desired MAP between the lower and upper threshold MAPs.

In some examples, additionally or alternatively, the compressor may be activated in response to an engine speed being substantially equal to a relatively high engine speed, wherein the relatively high engine speed corresponds to a high engine load. As such, the compressor may be activated to provide more boost air to increase a power output to meet a driver demand.

At t3, the MAP is greater than the lower threshold MAP and less than the upper threshold MAP. As such, the electric turbocharger is switched to an OFF position corresponding with mode 2. Therefore, boost does now flow to the engine, vacuum is not generated, and exhaust backpressure is not deliberately increased.

Between t3 and t4, the MAP begins to increase toward the upper threshold MAP. At t4, the MAP increases to a MAP greater than the upper threshold MAP. In response, the electric turbocharger is activated and operated in mode 3. As such, the turbine and the compressor are spun in the second direction. However, due to the engine being operated outside of a cold-start and a desire to meet driver demand, the RPM of the turbine and compressor may be greater than (e.g., less negative) than the RPM prior to t1. This may allow the MAP to increase while mitigating the increase of exhaust backpressure production. In this way, a fuel injection volume may not increase to meet the increased MAP. Rather, the MAP may be decreased via the electric turbocharger to increase fuel economy.

Additionally or alternatively, the engine speed may decrease to an engine speed corresponding to an idle engine speed. As a result, the MAP may be increase toward a MAP greater than the upper threshold MAP. Thus, the electric turbocharger may be activated and operating in mode 3, where both the compressor and the turbine are spun in the second direction. By doing this, not only may the MAP begin to decrease, but a vacuum may be generated in the manifold as well, where the vacuum may be supplied to one or more vacuum reservoirs. In this way, the turbocharger may be operated in mode 3 outside of a cold-start.

In some examples, a vehicle may start prior to t1, where the start is a cold-start. As such, the turbine and compressor are spun in the second direction to decrease the cold-start duration. A driver may drive the vehicle, where the rotating of the turbine and compressor may be adjusted in response to a MAP and not to the cold-start. For example, if the MAP falls below the lower threshold MAP, then the turbine and compressor are spun in the first direction to increase the MAP. Alternatively, if the MAP increased above the upper threshold MAP, then the turbine and compressor are spun in the second direction to decrease the MAP. In some examples, the RPM of the compressor and turbine in response to the MAP may be adjusted based on one or more of engine operating parameters and a magnitude in which the MAP deviates beyond the lower or upper threshold MAP. The RPM of the compressor and turbine in the first direction may be adjusted based on a boost demand, wherein the RPM is decreased in response to a reduced or no boost demand. Additionally or alternatively, the RPM of the compressor and turbine in the second direction may be adjusted based on one or more of a boost demand and combustion stability. For example, if boost is demanded, or if combustion stability is relatively low, then the RPM of the compressor and turbine in the second direction, to lower the MAP, may be decreased. As such, it may take longer to decrease the MAP. Lastly, if the magnitude of the deviation between the MAP and the lower or upper threshold MAP is low (e.g., within 10%), then the RPM of the turbine and compressor may be correspondingly low (e.g., 20). However, if the magnitude of the deviation between the MAP and the lower or upper threshold MAP is relatively high (e.g., within 50%), then the RPM of the turbine and the compressor may be correspondingly high (e.g., 100).

Between t4 and t5, the RPM continues to decrease to a more negative RPM. However, the RPM does not reach a RPM as negative as the RPM prior to t1. This may be due to one or more engine operating parameters associated with a driver demand, combustion stability, or the like. For example, if boost is demanded, then it may not be desired to decrease the RPM to a negative RPM similar to the negative RPM prior to t1. The MAP decreases toward the upper threshold MAP due to the mode 3 operation of the electric turbocharger.

At t5, the MAP is equal to a MAP less than the upper threshold MAP and greater than the lower threshold MAP. As such, the electric turbocharger may be operated in mode 2 (e.g., switched OFF). The RPM of the turbine and compressor increases to zero.

Thus, the graph 400 of FIG. 4 illustrates an example of an engine operating parameter outside of an engine cold-start where the turbine and compressor may be spun in the second, reverse direction. Additionally or alternatively, the turbine and compressor may be spun in the second direction in response to a vacuum demand from the vacuum reservoir outside of the cold-start. This may occur opportunistically based on driver demand and combustion stability. For example, if a vehicle is coasting or in a decelerated fuel shut-off event, where the engine is not receiving fuel, then the turbine and compressor may be spun in the second direction to decrease MAP. Additionally or alternatively, if a vehicle is at a stop and the engine is not being combusted or if the engine is at idle, then the turbine and compressor may be spun in the second direction to decrease MAP and provide vacuum to the vacuum reservoir.

In this way, an electric turbocharger may be configured to decrease cold-start durations and emissions, while simultaneously generating a vacuum in an engine intake. The vacuum may replenish a vacuum store of a vacuum reservoir as the cold-start is ongoing. The cold-start duration is decrease by spinning a turbine of the electric turbocharger in a reverse direction, where the reverse direction directs exhaust gas back to an engine, thereby increasing exhaust backpressure. The technical effect of reverse spinning the turbine is to allow exhaust gases to heat up before it flows through a catalyst downstream of the turbine. Additionally, by utilizing the electric turbocharger, additional cold-start components may be omitted from the manufacture of the vehicle. Thus, manufacturing costs, packaging constraints, and emissions may be decreased.

An embodiment of a method comprises determining an engine cold-start and rotating a turbine of an electric turbocharger in a reverse direction to increase exhaust backpressure, the turbine being mechanically coupled to a compressor via a shaft. A first example of the method further includes where rotation of the turbine is translated to the compressor. A second example of the method, optionally including the first example, further includes where rotating the turbine in the reverse direction directs exhaust gas toward the engine, and where the compressor rotates in the reverse direction, wherein the rotating of the compressor in the reverse direction directs boost air to an ambient atmosphere. A third example of the method, optionally including the first and/or second examples, further includes where the compressor increases a vacuum of an engine intake, and where a vacuum reservoir is fluidly coupled to the engine intake. A fourth example of the method, optionally including one or more of the first through third examples, further includes where rotating the turbine in a forward direction, opposite the reverse direction in response to the engine cold-start ending. A fifth example of the method, optionally including one or more of the first through fourth examples, further includes where the turbine is coupled to an electric motor, and where the electric motor is electrically coupled to an energy storage device.

An embodiment of a system comprises an engine comprising intake and exhaust passages, an electric turbocharger comprising an electrically actuated turbine coupled to a compressor via a shaft, the turbine being arranged in the exhaust passage and the compressor being arranged in the intake passage, and a controller with computer-readable instructions stored on non-transitory memory thereof that when executed enable the controller to rotate the turbine in a reverse direction to increase exhaust backpressure. A first example of the system further includes where the compressor rotates in the reverse direction when the turbine rotates in the reverse direction, and where the compressor increases a vacuum of the intake passage when it rotates in the reverse direction. A second example of the system, optionally including the first example, further includes where the turbine is rotated in the reverse direction in response to an engine cold-start or a manifold absolute pressure being greater than an upper threshold manifold absolute pressure. A third example of the system, optionally including the first and/or second examples, further includes where the controller further comprises instructions to rotate the turbine in a forward direction, opposite the reverse direction in response to a boost demand or a manifold absolute pressure being less than a lower threshold manifold pressure. A fourth example of the system, optionally including one or more of the first through third examples, further includes where the turbine is arranged upstream of an aftertreatment device. A fifth example of the system, optionally including one or more of the first through fourth examples, further includes where the turbine is directly coupled to an electric motor, further comprising a power actuator configured to meter an amount of power supplied from an energy storage device to the electric motor, and where a rotational speed of the turbine is proportional to the amount of power supplied.

An embodiment of an engine method comprises rotating an electric turbine in a first direction in response to a boost demand, and rotating the electric turbine in a second direction in response to a cold-start, the electric turbine being coupled to a compressor. A first example of the engine method further comprises where the electric turbine is arranged in an exhaust passage and the compressor is arranged in an intake passage, and where the compressor mirrors the rotating of the electric turbine. A second example of the engine method, optionally including the first example, further includes where rotating the electric turbine in the first direction in response to a manifold absolute pressure being less than a lower threshold manifold absolute pressure. A third example of the engine method, optionally including the first and/or second examples, further includes where rotating the electric turbine in the second direction in response to a manifold absolute pressure being greater than an upper threshold manifold absolute pressure. A fourth example of the engine method, optionally including one or more of the first through third examples, further includes where rotating the electric turbine in the second direction in response to the cold-start comprises a higher rotations-per-minute than rotating the electric turbine in the second direction in response to the manifold absolute pressure being greater than the upper threshold manifold absolute pressure. A fifth example of the engine method, optionally including one or more of the first through fourth examples, further includes where deactivating the electric turbine in response to the manifold absolute pressure being less than the upper threshold manifold absolute pressure and greater than a lower threshold manifold absolute pressure. A sixth example of the engine method, optionally including one or more of the first through fifth examples, further includes where a speed of the electric turbine in the first direction or the second direction is adjusted based on one or more of a manifold absolute pressure, an exhaust backpressure, and a boost demand. A seventh example of the engine method, optionally including one or more of the first through sixth examples, further includes where a vacuum reservoir being fluidly coupled to a portion of an intake passage between the compressor and an engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during an engine cold-start, rotating a turbine of an electric turbocharger in a reverse direction to increase exhaust backpressure, the turbine being mechanically coupled to a compressor via a shaft, wherein the compressor increases a vacuum of an engine intake, and where a vacuum reservoir is fluidly coupled to the engine intake; and during conditions outside the engine cold-start, rotating the turbine in the reverse direction in response to intake manifold pressure reaching a threshold even when a catalyst is sufficiently warmed-up.

2. The method of claim 1, wherein rotation of the turbine is translated to the compressor.

3. The method of claim 1, wherein rotating the turbine in the reverse direction directs exhaust gas toward an engine, and where the compressor rotates in the reverse direction, wherein the rotating of the compressor in the reverse direction directs boost air to an ambient atmosphere.

4. The method of claim 1, further comprising rotating the turbine in a forward direction, opposite the reverse direction in response to the engine cold-start ending.

5. The method of claim 1, wherein the turbine is coupled to an electric motor, and where the electric motor is electrically coupled to an energy storage device.

6. A system, comprising:
an engine comprising intake and exhaust passages;
an electric turbocharger comprising an electrically actuated turbine coupled to a compressor via a shaft, the turbine being arranged in the exhaust passage and the compressor being arranged in the intake passage; and
a controller with computer-readable instructions stored on non-transitory memory thereof that when executed enable the controller to:
rotate the turbine in a reverse direction to increase exhaust backpressure during catalyst warm-up responsive to an engine cold-start; and
rotate the turbine in the reverse direction during conditions outside the engine cold-start even when the catalyst is sufficiently warmed-up.

7. The system of claim 6, wherein the compressor rotates in the reverse direction when the turbine rotates in the reverse direction, and where the compressor increases a vacuum of the intake passage when it rotates in the reverse direction.

8. The system of claim 6, wherein the turbine is further rotated in the reverse direction in response to a manifold absolute pressure being greater than an upper threshold manifold absolute pressure.

9. The system of claim 6, wherein the controller further comprises instructions to rotate the turbine in a forward direction, opposite the reverse direction in response to a boost demand or a manifold absolute pressure being less than a lower threshold manifold pressure.

10. The system of claim 6, wherein the turbine is arranged upstream of an aftertreatment device.

11. The system of claim 6, wherein the turbine is directly coupled to an electric motor, further comprising a power actuator configured to meter an amount of power supplied from an energy storage device to the electric motor, and where a rotational speed of the turbine is proportional to the amount of power supplied.

12. An engine method, comprising:
rotating an electric turbine in a first direction in response to a boost demand; and
rotating the electric turbine in a second direction in response to a cold-start or engine idle, the electric turbine being coupled to a compressor; and
rotating the electric turbine in the second direction, after completion of the cold-start even with catalyst temperature above a light-off temperature in response to an intake manifold absolute pressure being greater than an upper threshold manifold absolute pressure.

13. The engine method of claim 12, wherein the electric turbine is arranged in an exhaust passage and the compressor is arranged in an intake passage, and where the compressor mirrors the rotating of the electric turbine.

14. The engine method of claim 12, further comprising rotating the electric turbine in the first direction in response to the intake manifold absolute pressure being less than a lower threshold manifold absolute pressure.

15. The engine method of claim 12, wherein rotating the electric turbine in the second direction in response to the cold-start comprises a higher rotations-per-minute than rotating the electric turbine in the second direction in response to the intake manifold absolute pressure being greater than the upper threshold manifold absolute pressure.

16. The engine method of claim 12, further comprising deactivating the electric turbine in response to the intake manifold absolute pressure being less than the upper threshold manifold absolute pressure and greater than a lower threshold manifold absolute pressure.

17. The engine method of claim 12, wherein a speed of the electric turbine in the first direction or the second direction is adjusted based on one or more of the intake manifold absolute pressure, an exhaust backpressure, and a boost demand.

18. The engine method of claim 12, further comprising a vacuum reservoir being fluidly coupled to a portion of an intake passage between the compressor and an engine.

\* \* \* \* \*